(12) United States Patent
Horsfield

(10) Patent No.: US 11,910,796 B2
(45) Date of Patent: Feb. 27, 2024

(54) HIGHLY LOADED CLOPYRALID DUAL-SALT FORMULATION

(71) Applicant: Adama Australia Pty Limited, St Leonards (AU)

(72) Inventor: Andrew Horsfield, Bracken Ridge (AU)

(73) Assignee: ADAMA AUSTRALIA PTY LIMITED, St Leonards (AU)

( * ) Notice: Subject to any disclaimer, the term of this patent is extended or adjusted under 35 U.S.C. 154(b) by 196 days.

(21) Appl. No.: 17/097,043

(22) Filed: Nov. 13, 2020

(65) Prior Publication Data
US 2021/0137111 A1    May 13, 2021

(30) Foreign Application Priority Data

Nov. 13, 2019 (AU) .................. 2019904273

(51) Int. Cl.
| | | |
|---|---|---|
| *A01N 43/40* | (2006.01) | |
| *A01N 39/04* | (2006.01) | |
| *A01N 37/40* | (2006.01) | |
| *A01N 25/02* | (2006.01) | |
| *A01N 25/22* | (2006.01) | |

(52) U.S. Cl.
CPC ............. *A01N 43/40* (2013.01); *A01N 25/02* (2013.01); *A01N 37/40* (2013.01)

(58) Field of Classification Search
None
See application file for complete search history.

(56) References Cited

FOREIGN PATENT DOCUMENTS

| | | | |
|---|---|---|---|
| CN | 102283196 A | * | 12/2011 |
| CN | 102960344 A | * | 3/2013 |

OTHER PUBLICATIONS

Espacenet partial translation of CN 102960344 retrieved Oct. 19, 2022.
Google patents partial translation of CN 102960344 retrieved Sep. 1, 2023.

* cited by examiner

*Primary Examiner* — Alton N Pryor
(74) *Attorney, Agent, or Firm* — Panitch Schwarze Belisario & Nadel LLP; Travis W. Bliss

(57) ABSTRACT

The present disclosure provides a clopyralid formulation for dealing with weeds in crops or pastures or fallow areas. The formulation is highly loaded, clopyralid being present at a concentration of at least 600 g acid equivalent (ae) per litre. Clopyralid is present in the form of at least two amine salts, one being the monoisopropylamine salt.

8 Claims, No Drawings

HIGHLY LOADED CLOPYRALID DUAL-SALT FORMULATION

CROSS-REFERENCE TO RELATED APPLICATION

This application claims priority under 35 U.S.C. § 119(b) to Australian Patent Application No. 2019904273 filed on Nov. 13, 2019, the disclosure of which is incorporated herein by reference in its entirety.

TECHNICAL FIELD

The invention relates to novel clopyralid formulations. In particular, the invention is concerned with highly loaded clopyralid formulations, containing two or more salts of clopyralid.

BACKGROUND ART

Clopyralid (3,6-dichloro-2-pyridinecarboxylic acid) is a pyridine herbicide suitable for the control of weeds. It has been marketed globally as both solo formulations and as co-formulations with a range of other active ingredients. These formulations are used for control of weeds in a range of agricultural, commercial, home garden and industrial situations.

As a solo formulation, clopyralid liquid formulations are typically soluble liquid (SL) formulations that contain an active ingredient concentration of a single amine salt, such as dimethylammonium (DMA), potassium or triisopropanolamine (TIPA), at a concentration of 300-750 g/L or a mixture of dimethylamine (DM) and monoethylamine salts at 750 g/L. Other SL mixture formulations contain a single amine salt being the monoethanolamine (MEA), triethylamine or triethanolamine.

Existing clopyralid single-salt formulations at the >350-450 g ae/L concentration (600 g/L in commercialized formulations in Australia) have a viscosity specification that is either very low or moderate to high. The DM+monoethylamine clopyralid 750 g/L formulation currently available in Australia has a viscosity of ≈50 cP at 5° C. A low viscosity formulation may be more prone to splashing and poor containment due to spillage. A higher viscosity formulation is by definition more difficult to pour and pump under cold conditions, which are common where clopyralid formulations are used i.e. winter cereal production in Australia. An example of a low viscosity single-salt formulation is the 600 g/L MEA salt, which has a viscosity of <50 cP. An example of a high viscosity single-salt formulation is the 600 g/L TIPA salt, which has a viscosity of up to 800 cP.

High concentration formulations are generally desirable: a highly loaded formulation can deliver the required quantity of active ingredient to a user in a smaller volume and lower weight. For formulators, higher concentration formulations reduce the quantity of formulated product to be produced. There is a saving in packaging, freight costs, storage volume and energy costs and a reduction of waste.

It would be beneficial to provide formulations of clopyralid which are highly loaded to a concentration of 600 g ae/L or more and which have acceptable viscosity at temperatures commonly encountered at application times.

It has been discovered that it is possible to provide clopyralid formulations that are highly loaded yet stable, and which have acceptable viscosity, where clopyralid is present in the form of at least two amine salts, one of which is the monoisopropylamine (MIPA) salt.

SUMMARY OF THE INVENTION

Accordingly, the invention provides a clopyralid formulation containing clopyralid at a concentration of at least 600 g ae/L, clopyralid present in the form of at least two amine salts, one of which is the monoisopropylamine salt.

It has been found that clopyralid as the MIPA salt has the advantage of neutralizing the clopyralid acid to create a stable formulation.

Preferably, the second amine salt of clopyralid is the monoethanolamine salt (MEA).

The use of MEA and MIPA as neutralizing agents can also increase the compatibility of clopyralid with other salt-based aqueous concentrates, such as glyphosate and 2,4-D amine. Both MEA and MIPA are acid neutralization agents used in widely used commercial formulations of glyphosate, which can simplify the procurement of raw materials for production of multiple SL formulations.

DETAILED DESCRIPTION OF PREFERRED EMBODIMENTS

Example 1: Soluble Liquid Clopyralid Formulation (SL) as MIPA and MEA Salts

The components were as set out in Table 1:

TABLE 1

| Components | | | |
|---|---|---|---|
| Content g/L | Component | Purpose in Formulation | Supplier |
| 628.93 | Clopyralid Technical 95.4% | active ingredient | Lier Chemical Co., Ltd |
| 138.51 | MIPA 70 (Isopropylamine 70% Solution) | reactant | Redox Pty Ltd |
| 100.21 | MEA (Monoethanolamine 98%) | reactant | Sigma Aldrich |
| 75.00 | TERWET ® 1255 | wetting agent | Huntsman Australia Pty Ltd |
| 0.50 | Rhodoline 5338 AG | antifoam | Solvay Interox Pty Ltd |
| 312.74 | Water | diluent | Potable water |

Details of the components are set out in Table 2:

TABLE 2

| Component Details | | |
|---|---|---|
| Trade Name | IUPAC NAME | CAS# |
| Clopyralid Technical 95% | 3,6-dichloropyridine-2-carboxylic acid | 1702-17-6 |
| MIPA 70 (Isopropylamine 70% Solution) | propan-2-amine | 75-31-0 |
| MEA (Monoethanolamine 98%) | 2-aminoethanol | 141-43-5 |
| TERWET ® 1255 | amines, tallow alkyl, ethoxylated | 61791-26-2 |
| Rhodoline 5338 AG | proprietary blend, composition undisclosed | — |
| Water | water | — |

To prepare the formulation, 90% of the water was charged into a cooled reaction vessel. The MIPA 70 was added, stirring was commenced and continued with addition of the MEA.

Clopyralid Technical was added slowly, while maintaining the reaction temperature between 40 and 45° C. Upon completion of the Clopyralid Technical addition, the mixture was stirred for a further 30 mins to ensure complete dissolution.

The TERWET 1255 was added while stirring continued and thoroughly blended.

Rhodoline 5338 AG was premixed with the remaining water and then added to the formulation and blended thoroughly.

The clopyralid content was checked and adjusted with more water as required.

The resultant SL formulation was analysed. The analysis is in Table 3:

TABLE 3

| Analysis | | | | |
|---|---|---|---|---|
| Determination | Method | Specification | Analysis | Result |
| Appearance, Physical State & Colour | Visual | Clear amber liquid | Clear amber liquid | PASS |
| Odour | Olfactory | negligible | negligible | PASS |
| pH - 1% v/v dilution | CIPAC MT 75.3 | 6.00-7.00 | 6.70 | PASS |
| Density @ 20° C. | Density Meter Anton Paar DMA 48 | 1.249-1.263 g/mL | 1.254 g/mL | PASS |
| Solution Stability Standard Water C | CIPAC MT 41 5.0 mL/100 ml | trace sediment after 30 mins | nil sediment after 18 hrs | PASS |
| Persistent foam Standard Water C | CIPAC MT 47.2 1.0 mL/200 mL | max 60 mL foam after 1 min | Initial: 60 mL After 10 sec: 33 mL After 3 min: 0 mL After 12 min: 0 mL | PASS |
| Brookfield Viscosity | SPI 50 rpm SPI 50 rpm SPI 20 rpm | Limits not defined | 58 cps @ 25° C. 112 cps @ 10° C. 284 cps @ 0° C. | |
| Content Clopyralid | Nominal | 575-625 g/L | 600 g/L | N.T. |

The formulation was suitable for packaging in a HDPE container with a screw cap closure.

The formulation was subjected to accelerated storage conditions in that HDPE container. It was determined to be stable to heat for 2 weeks at 54° C. and therefore is expected to be shelf stable for at least 2 years.

A 100 mL sample of the formulation which has been subjected to accelerated storage conditions as above was then moved to a centrifuge tube and subjected to seeded cold storage conditions for 7 days at 0° C. The absence of any separated material indicated that the formulation was cold storage stable.

The pH of the embodiment containing the MIPA and MEA salts is 6.70 (1% v/v dilution). The formulation has low persistent foam (0-5 mm after 60 seconds) and a density at 20° C. of 1.25 g/mL. The formulation is stable for all parameters according to the standard CIPAC accelerated testing regime of 14 days at 54° C.

In conclusion, the new clopyralid dual-salt formulation has a novel combination of clopyralid salts including a new salt (MIPA). This formulation enables a stable concentration of 600 g ae/L with a desirable viscosity profile of >50 to <300 cP at 0-25° C.

Formulations of other clopyralid dual salts, being the MIPA salt and another amine salt, may be made in the same general way, as will be apparent to one skilled in the art.

Example 2: Field Tests

Field trials were conducted to evaluate the efficacy of the SL clopyralid formulation of Example 1, identified as DS-11137.

Field Test 1: Forthside, Tasmania

At Forthside, Tasmania in 2018, a field trial was conducted to evaluate DS-11137 for bioequivalence with the commercially registered formulation "Victory Herbicide 300 SL", containing 300 g clopyralid/L present as the triisopropanolamine salt, for control of volunteer *faba* beans (*Vicia faba*) and blue lupins (*Lupinus angustifolius*) in wheat cv. Beaufort.

Other products were also tested. The product details are in Table 4:

TABLE 4

| Products | | | | |
|---|---|---|---|---|
| Product name | Active ingredient (ai) | Concentration of active ingredient | Formulation | Supplier |
| Victory 300 SL | clopyralid | 300 g/L | Soluble concentrate | Adama Australia Pty Limited |
| MCPA LVE 570 EC | MCPA | 570 g/L | Emulsifiable concentrate | Adama Australia Pty Limited |
| DS-11137 | clopyralid | 600 g/L | Soluble concentrate | |

Treatments included:
Victory 300 SL and DS-11137 each applied solo at 45, 75 and 150 g ai/ha,
Victory 300 SL and DS-11137 each applied tank mixed with MCPA LVE 570 EC at 400 g ai/ha,
Treatments are set out in Table 5:

TABLE 5

| | | Treatments | | |
|---|---|---|---|---|
| | | Rate | | |
| No. | Product | Product (mL/ha) | Active ingredient (g ai/ha) | Application schedule |
| 1 | Untreated control | Nil | Nil | N/A |
| 2 | Victory Herbicide 300 SL | 150 | 45 | A single foliar application made prior to wheat reaching growth stage BBCH 30, in a spray volume of 110 L/ha, generating a coarse spray droplet. |
| 3 | Victory Herbicide 300 SL | 250 | 75 | |
| 4 | Victory Herbicide 300 SL | 500 | 150 | |
| 5 | Victory Herbicide 300 SL | 150 | 45 | |
| | MCPA LVE 570 EC | 700 | 400 | |
| 6 | DS-11137 | 75 | 45 | |
| 7 | DS-11137 | 125 | 75 | |
| 8 | DS-11137 | 250 | 150 | |
| 9 | DS-11137 | 75 | 45 | |
| | MCPA LVE 570 EC | 700 | 400 | |

Treatments were applied as a single foliar application when the wheat had one to two tillers (BBCH 21-22), in a spray volume of 110 L/ha generating a coarse spray quality. Weed control, crop safety and wheat vigour assessments were conducted at 14, 28 and 43 days after application (DAA). Weed counts were carried out at 43DAA.

Volunteer *faba* bean control is shown in Table 6:

TABLE 6

| Volunteer Faba Bean Control No. | Treatment | Rate (g ai/ha) | Volunteer faba bean control (% leaf area affected) | |
|---|---|---|---|---|
| | | | Chlorosis 14 DAA | Epinasty 28 DAA |
| 1 | Untreated control | Nil | 0 e | 0 b |
| 2 | Victory Herbicide 300 SL | 45 | 56 c | 50 a |
| 3 | Victory Herbicide 300 SL | 75 | 97 a | 38 a |
| 4 | Victory Herbicide 300 SL | 150 | 97 a | 39 a |
| 5 | Victory Herbicide 300 SL | 45 | 97 a | 60 a |
| | MCPA LVE 570 EC | 400 | | |
| 6 | DS-11137 | 45 | 95 a | 40 a |
| 7 | DS-11137 | 75 | 97 a | 45 a |
| 8 | DS-11137 | 150 | 98 a | 59 a |
| 9 | DS-11137 | 45 | 98 a | 51 a |
| | MCPA LVE 570 EC | 400 | | |
| | P-value | | 0.0001 | 0.0045 |
| | LSD (P ≤ 0.05) | | 14.8 | 23.7 |

DAA = Days after application
Means followed by the same letter are not significantly different (P = 0.05, Duncan's New MRT)

DAA=Days after application
Means followed by the same letter are not significantly different (P=0.05, Duncan's New MRT)

Percent of volunteer *faba* bean leaf area affected by brownout is shown in Table 7:

TABLE 7

| | Volunteer Faba Bean Brownout | | | |
|---|---|---|---|---|
| | | Rate | Volunteer faba bean brownout (% leaf area affected) | |
| No. | Treatment | (g ai/ha) | 28 DAA | 43 DAA |
| 1 | Untreated control | Nil | 0 b | 0 c |
| 2 | Victory Herbicide 300 SL | 45 | 76 a | 66 ab |
| 3 | Victory Herbicide 300 SL | 75 | 62 a | 100 a |
| 4 | Victory Herbicide 300 SL | 150 | 75 a | 83 ab |
| 5 | Victory Herbicide 300 SL | 45 | 88 a | 100 a |
| | MCPA LVE 570 EC | 400 | | |
| 6 | DS-11137 | 45 | 65 a | 100 a |
| 7 | DS-11137 | 75 | 70 a | 88 ab |
| 8 | DS-11137 | 150 | 73 a | 100 a |
| 9 | DS-11137 | 45 | 81 a | 99 a |
| | MCPA LVE 570 EC | 400 | | |
| | P-value | | 0.0061 | 0.0001 |
| | LSD (P ≤ 0.05) | | 35.9 | tA |

DAA = Days after application
Means followed by the same letter are not significantly different (P = 0.05, Duncan's New MRT)
tA = Original plot means are presented with analysis of variance and letters of separation from data transformed using y = Arcsine square root percent (x)

Blue Lupin control is shown in Table 8:

TABLE 8

| | Blue Lupin Control | | | |
|---|---|---|---|---|
| | | Rate | Blue lupin control (% leaf area affected) | |
| | | | Epinasty | Brownout |
| No | Treatment | (g ai/ha) | 14 DAA | 28 DAA | 43 DAA |
| 1 | Untreated control | Nil | 0 d | 0 d | 0 e |
| 2 | Victory Herbicide 300 SL | 45 | 1 d | 4 bcd | 13 de |
| 3 | Victory Herbicide 300 SL | 75 | 7 cd | 13 ab | 48 bcd |
| 4 | Victory Herbicide 300 SL | 150 | 13 cd | 2 cd | 36 cde |
| 5 | Victory Herbicide 300 SL | 45 | 83 a | 24 ab | 98 a |
| | MCPA LVE 570 EC | 400 | | | |
| 6 | DS-11137 | 45 | 6 cd | 8 bc | 30 cde |
| 7 | DS-11137 | 75 | 19 c | 8 bcd | 44 cd |
| 8 | DS-11137 | 150 | 9 cd | 8 bc | 73 abc |
| 9 | DS-11137 | 45 | 73 ab | 10 bcd | 64 abc |
| | MCPA LVE 570 EC | 400 | | | |
| | P-value | | 0.0001 | 0.0007 | 0.0002 |
| | LSD (P ≤ 0.05) | | 12.6 | tL | tA |

DAA = Days after application
Means followed by the same letter are not significantly different (P = 0.05, Duncan's New MRT)
tL = Original plot means are presented with analysis of variance and letters of separation from data transformed using y = Log (x + 1)
tA = Original plot means are presented with analysis of variance and letters of separation from data transformed using y = Arcsine square root percent (x)

Table 9 shows effectiveness of the treatments on each on volunteer *faba* bean and blue lupin at 43 days after application:

TABLE 9

Faba Bean and Blue Lupin Counts at 43 DAA

| | | | Weed counts (Number per plot) | |
|---|---|---|---|---|
| No. | Treatment | Rate (g ai/ha) | Volunteer faba beans 43 DAA | Blue lupins 43 DAA |
| 1 | Untreated control | Nil | 27 a | 22 a |
| 2 | Victory Herbicide 300 SL | 45 | 1 d | 5 bc |
| 3 | Victory Herbicide 300 SL | 75 | 0 d | 2 cde |
| 4 | Victory Herbicide 300 SL | 150 | 0 d | 2 bcde |
| 5 | Victory Herbicide 300 SL MCPA LVE 570 EC | 45 400 | 0 d | 0 e |
| 6 | DS-11137 | 45 | 0 d | 9 ab |
| 7 | DS-11137 | 75 | 0 d | 3 bcd |
| 8 | DS-11137 | 150 | 0 d | 7 ab |
| 9 | DS-11137 MCPA LVE 570 EC | 45 400 | 0 d | 2 cde |
| | P-value | | 0.0001 | 0.0001 |
| | LSD (P < 0.05) | | tL | tL |

DAA = Days after application
Note, treatment data with the same number but different letters of separation can result from statistics relying on transformed data
Means followed by the same letter are not significantly different (P = 0.05, Duncan's New MRT)
NSD = No significant difference due to a P-value > 0.05
tL = Original plot means are presented with analysis of variance and letters of separation from data transformed using y = Log (x + 1)

All treatments of Victory 300 SL and DS-11137 offered excellent control of volunteer *faba* beans and good control of blue lupin.

MCPA LVE 570 EC tank mixed with either Victory 300 SL or DS-11137 offered greater control of blue lupins than either product applied as standalone treatments.

All herbicide treatments mixed well with no issues at the time of spraying. All Victory 300 SL and DS-11137 treatments were safe to wheat cv. Beaufort under the conditions of this trial.

Field Test 2: Sassafras, Tasmania

At Sassafras, Tasmania, a field trial was conducted to evaluate DS-11137 for bioequivalence with Victory 300 SL for control of spear thistle (*Cirsium vulgare*) in a fallow situation.

The product details are in Table 10:

TABLE 10

Product Details

| Product name | Active ingredient (ai) | Concentration of active ingredient | Formulation |
|---|---|---|---|
| DS-11137 | clopyralid | 600 g/L | Soluble concentrate |
| Victory 300 SL | clopyralid | 300 g/L | Soluble concentrate |
| MCPA 500 AC | MCPA | 500 g/L | Aqueous concentrate |

Treatments included either DS-11137 and Victory 300 SL applied at 7.5, 15 or 21 g ai/ha in tank mixtures with MCPA 500 AC at 500 g ai/ha. (MCPA 500 AC is available through various suppliers.) Treatments were applied as a single foliar application to actively growing spear thistles at the 5 to 6 true leaf growth stage. Applications were made in a spray volume of 110 L/ha with air induction flat fan nozzles generating a coarse spray quality.

Table 11 shows the treatments:

TABLE 11

Treatments applied at Sassafras, Tasmania to evaluate DS-11137 in fallow

| | | Rate | | |
|---|---|---|---|---|
| No. | Product | Product (mL/ha) | Active ingredient (g ai/ha) | Application schedule |
| 1 | Victory Herbicide 300 SL + MCPA 500 AC | 25 1000 | 7.5 500 | A single foliar application in a spray volume of 110 L/ha, generating a coarse spray quality to actively growing thistles at BBCH 15-16. |
| 2 | Victory Herbicide 300 SL + MCPA 500 AC | 50 1000 | 15 500 | |
| 3 | Victory Herbicide 300 SL + MCPA 500 AC | 70 1000 | 21 500 | |
| 4 | DS-11137 + MCPA 500 AC | 12.5 1000 | 7.5 500 | |
| 5 | DS-11137 + MCPA 500 AC | 25 1000 | 15 500 | |
| 6 | DS-11137 + MCPA 500 AC | 35 1000 | 21 500 | |
| 7 | Untreated control | Nil | Nil | N/A |

Spear thistle density was assessed prior to treatment application and again at 56 days after application (56DAA). Efficacy against spear thistle was assessed at 14, 28, 42 and 56DAA.

Table 12 details effect on spear thistle:

TABLE 12

Spear Thistle Curling and Chlorosis

| No. | Treatment | Rate (g ai/ha) | Thistle curling (% leaf area) 14 DAA | Thistle chlorosis (% leaf area) 28 DAA |
|---|---|---|---|---|
| 1 | Victory herbicide 300 SL MCPA 500 AC | 7.5 500 | 15 | 15 a |
| 2 | Victory herbicide 300 SL MCPA 500 AC | 15 500 | 23 | 18 a |
| 3 | Victory herbicide 300 SL MCPA 500 AC | 21 500 | 19 | 18 a |
| 4 | DS-11137 MCPA 500 AC | 7.5 500 | 19 | 14 a |
| 5 | DS-11137 MCPA 500 AC | 15 500 | 21 | 13 a |
| 6 | DS-11137 MCPA 500 AC | 21 500 | 20 | 20 a |
| 7 | Untreated control | Nil | 0^ | 0 b |
| | P-value | | 0.3691 | 0.0010 |
| | LSD (P ≤ 0.05) | | NSD | 7.7 |
| | Factorial analysis Rate | | | |
| | 7.5 + 500 g ai/ha | | 17 | 14 |
| | 15 + 500 g ai/ha | | 22 | 15 |
| | 21 + 500 g ai/ha | | 19 | 19 |
| | P-value | | 0.1481 | 0.2659 |
| | LSD (P ≤ 0.05) | | NSD | NSD |

TABLE 12-continued

Spear Thistle Curling and Chlorosis

| No. | Treatment | Rate (g ai/ha) | Thistle curling (% leaf area) 14 DAA | Thistle chlorosis (% leaf area) 28 DAA |
|---|---|---|---|---|
| | Formulation | | | |
| | Victory herbicide 300 SL MCPA 500 AC | | 19 | 17 |
| | DS-11137 MCPA 500 AC | | 20 | 16 |
| | P-value | | 0.5327 | 0.6108 |
| | LSD (P ≤ 0.05) | | NSD | NSD |

DAA = Days after application
Means followed by the same letter are not significantly different (P = 0.05, LSD)
NSD = No significant difference due to a P-value > 0.05
^Treatment 7 has been excluded from statistical analysis to correct for skewness Table 13 shows necrosis as a percent of leaf area, while Table 14 shows spear thistle counts:

TABLE 13

Spear Thistle Necrosis

| No. | Treatment | Rate (g ai/ha) | Spear thistle necrosis (% leaf area) 28 DAA | 42 DAA |
|---|---|---|---|---|
| 1 | Victory herbicide 300 SL | 7.5 | 17 b | 71 b |
| | MCPA 500 AC | 500 | | |
| 2 | Victory herbicide 300 SL | 15 | 18 b | 78 ab |
| | MCPA 500 AC | 500 | | |
| 3 | Victory herbicide 300 SL | 21 | 18 b | 84 a |
| | MCPA 500 AC | 500 | | |
| 4 | DS-11137 | 7.5 | 13 c | 73 b |
| | MCPA 500 AC | 500 | | |
| 5 | DS-11137 | 15 | 17 b | 79 ab |
| | MCPA 500 AC | 500 | | |
| 6 | DS-11137 | 21 | 21 a | 81 a |
| | MCPA 500 AC | 500 | | |
| 7 | Untreated control | Nil | 0 ^ | 0 ^ |
| | P-value | | 0.0004 | 0.0218 |
| | LSD (P ≤ 0.05) | | 2.7 | 7.6 |
| | Factorial analysis Rate | | | |
| | 7.5 g ai/ha | | 15 b | 72 b |
| | 15 g ai/ha | | 17 a | 78 a |
| | 21 g ai/ha | | 19 a | 83 a |
| | P-value | | 0.0004 | 0.0028 |
| | LSD (P ≤ 0.05) | | 2 | 5 |
| | Formulation | | | |
| | Victory herbicide 300 SL MCPA 500 AC | | 17 | 78 |
| | DS-11137 MCPA 500 AC | | 17 | 78 |
| | P-value | | 0.5713 | 1.0000 |
| | LSD (P ≤ 0.05) | | NSD | NSD |

DAA = Days after application
Means followed by the same letter are not significantly different (P = 0.05, LSD)
NSD = No significant difference due to a P-value > 0.05
^ Treatment 7 has been excluded from statistical analysis to correct for skewness

TABLE 14

Spear Thistle Counts

| No. | Treatment | Rate (g ai/ha) | Spear thistle counts (number/m$^2$) 0 DAA | 56 DAA |
|---|---|---|---|---|
| 1 | Victory herbicide 300 SL | 7.5 | — | 0 |
| | MCPA 500 AC | 500 | | |
| 2 | Victory herbicide 300 SL | 15 | — | 0 |
| | MCPA 500 AC | 500 | | |
| 3 | Victory herbicide 300 SL | 21 | — | 0 |
| | MCPA 500 AC | 500 | | |
| 4 | DS-11137 | 7.5 | — | 0 |
| | MCPA 500 AC | 500 | | |
| 5 | DS-11137 | 15 | — | 0 |
| | MCPA 500 AC | 500 | | |
| 6 | DS-11137 | 21 | — | 0 |
| | MCPA 500 AC | 500 | | |
| 7 | Untreated control | Nil | 30 | 34 ^ |
| | P-value | | — | 1.0000 |
| | LSD (P ≤ 0.05) | | — | NSD |
| | Factorial analysis Rate | | | |
| | 7.5 g ai/ha | | — | 0 |
| | 15 g ai/ha | | — | 0 |
| | 21 g ai/ha | | — | 0 |
| | P-value | | — | 1.0000 |
| | LSD (P ≤ 0.05) | | — | NSD |
| | Formulation | | | |
| | Victory herbicide 300 SL MCPA 500 AC | | — | 0 |
| | DS-11137 MCPA 500 AC | | — | 0 |
| | P-value | | — | 1.0000 |
| | LSD (P ≤ 0.05) | | — | NSD |

DAA = Days after application
Means followed by the same letter are not significantly different (P = 0.05, LSD)
NSD = No significant difference due to a P-value > 0.05
^Treatment 7 has been excluded from statistical analysis to correct for skewness All herbicide treatments caused significant chlorosis to thistles at 28DAA.

All herbicide treatments caused equivalent leaf area necrosis to thistles at 28 and 42DAA.

All herbicide treatments significantly reduced thistle numbers compared to the untreated control.

DS-11137 was bioequivalent to Victory for the control of thistles at all assessments.

All treatments of Victory and DS-11137 gave complete control of spear thistle.

Field Test 3: Moriarty, Tasmania

At Moriarty, Tasmania, a field trial was conducted to evaluate DS-11137 the bioequivalence of Victory Herbicide 300 SL for control of slender thistle (*Carduus tenuiflorus*) and prickly sowthistle (*Sonchus asper*) and on pasture safety in a perennial grass pasture.

The products are detailed in Table 15:

TABLE 15

Products

| Product name | Active ingredient (ai) | Concentration of active ingredient | Formulation |
|---|---|---|---|
| DS-11137 | clopyralid | 600 g/L | Soluble concentrate |
| Victory Herbicide 300 SL | Clopyralid present as the triisopropanolamine salt | 300 g/L | Soluble concentrate |
| MCPA 500 SL | MCPA present as the dimethylamine salt | 500 g/L | Soluble concentrate |

As shown in Table 16, treatments included either DS-11137 or Victory Herbicide applied at 15, 21 or 42 g ai/ha in tank mixtures with MCPA 500 SL at 500 g ai/ha. Treatments were applied as a single foliar spray to actively growing thistles at the 4-leaf to large rosette growth stage. Applications were made in a spray volume of 100 L/ha with air induction flat fan nozzles generating a coarse spray quality.

TABLE 16

Treatments

| No. | Product | Rate Product (mL/ha) | Rate Active ingredient (g ai/ha) | Application schedule |
|---|---|---|---|---|
| 1 | Untreated control | Nil | Nil | N/A |
| 2 | Victory Herbicide 300 SL + MCPA 500 SL | 50 + 1000 | 15 500 | Single foliar application with Lechler IDK 120-01 air induction flat fan nozzles in a spray volume of 100 L/ha |
| 3 | Victory Herbicide 300 SL + MCPA 500 SL | 70 + 1000 | 21 500 | |
| 4 | Victory Herbicide 300 SL + MCPA 500 SL | 140 + 1000 | 42 500 | |
| 5 | DS-11137 + MCPA 500 SL | 25 + 1000 | 15 500 | |
| 6 | DS-11137 + MCPA 500 SL | 35 + 1000 | 21 500 | |
| 7 | DS-11137 + MCPA 500 SL | 70 + 1000 | 42 500 | |

Slender thistle density was assessed prior to treatment application and again at 42 days after application (42DAA), when plant numbers were also assessed. Efficacy against slender thistle was assessed at 14, 27 and 42 days after application (DAA). The results at 42DAA are in Table 17:

TABLE 17

Slender thistle counts at 0 DAA and 42 DAA, and prickly sowthistle count at 42 DAA

| | | | Number of plants (plants/plot) | | |
|---|---|---|---|---|---|
| No | Treatment | Rate (g ai/ha) | Slender thistle 0 DAA | Slender thistle 42 DAA | Sow thistle 42 DAA |
| 1 | Untreated control | Nil | 11 | 10 a | 3 a |
| 2 | Victory Herbicide 300 SL + MCPA 500 SL | 15 500 | 13 | 0 b | 1 b |
| 3 | Victory Herbicide 300 SL + MCPA 500 SL | 21 500 | 19 | 0 b | 1 b |
| 4 | Victory Herbicide 300 SL + MCPA 500 SL | 42 500 | 12 | 0 b | 0 b |
| 5 | DS-11137 + MCPA 500 SL | 15 500 | 13 | 0 b | 0 b |
| 6 | DS-11137 + MCPA 500 SL | 21 500 | 14 | 0 b | 0 b |
| 7 | DS-11137 + MCPA 500 SL | 42 500 | 14 | 0 b | 0 b |
| | P-value | | 0.9819 | 0.0001 | 0.0004 |
| | LSD (P ≤ 0.05) | | NSD (tL*) | tL | tA |
| Factorial analysis | | | | | |
| Rate | | | | | |
| | 15 + 500 g ai/ha | | 13 | 0 | 0 |
| | 21 + 500 g ai/ha | | 17 | 0 | 0 |
| | 42 + 500 g ai/ha | | 13 | 0 | 0 |
| | P-value | | 0.6232 | 0.7939 | 0.6346 |
| | LSD (P ≤ 0.05) | | NSD | NSD | NSD |
| Formulation | | | | | |
| | Victory Herbicide 300 SL + MCPA 500 SL | | 15 | 0 | 0 |
| | DS-11137 + MCPA 500 SL | | 14 | 0 | 0 |
| | P-value | | 0.7151 | 0.3483 | 0.1347 |
| | LSD (P ≤ 0.05) | | NSD | NSD | NSD |

DAA = Days after application
Means followed by the same letter are not significantly different (P = 0.05, Duncan's New MRT)
NSD = No significant difference due to a P-value > 0.05
tL* = P-value and LSD from data transformed using y = Log (x + 1)
tL = Original plot means are presented with analysis of variance and letters of separation from data transformed using y = Log (x + 1)
tA = Original plot means are presented with analysis of variance and letters of separation from data transformed using y = Arcsine square root percent (x)

All herbicide treatments completely controlled slender thistle at 42DAA and had significant control of prickly sowthistle.

DS-11137 and Victory Herbicide were bioequivalent for effect on slender thistle and prickly sowthistle. Each demonstrated a greater effect on slender thistle at 14DAA when applied at higher rates, though by 27DAA were equivalent at all applied rates.

DS-11137 and Victory Herbicide, at rates of 15 to 42 g ai/ha, each in tank mixtures with MCPA, were safe to the perennial grass pasture under the conditions of this trial with no visible signs of phytotoxicity.

DS-11137 and Victory Herbicide both mixed readily with MCPA with no compatibility issues during application.

Field Test 4: Padthaway, South Australia

At Padthaway in South Australia, a field trial was conducted to evaluate crop safety and efficacy of DS-11137 compared to the registered formulation "Genfarm Clopyralid 600", when applied to canola cv. 45Y93CL, the weed being volunteer lucerne (*Medicago sativa*). (Genfarm Clopyralid 600 is supplied by Nutrien Ag Solutions Limited.)

The canola crop was sown in a moist clay loam soil with a knife point press wheel system at a rate of 3.0 kg/ha to a depth of 1.0 cm. The previous crop had been lucerne.

At 65 days after sowing, when the crop stage had reached BBCH scale 16, treatments 2 to 5 in Table 18 below were applied:

TABLE 18

Treatments

| No. | Product | Rate Product (mL or g/ha) | Rate Active ingredient (g ai/ha) |
|---|---|---|---|
| 1 | Untreated control | Nil | Nil |
| 2 | Genfarm Clopyralid 600 | 150 | 90 |
| 3 | Genfarm Clopyralid 600 | 300 | 180 |
| 4 | DS-11137 | 150 | 90 |
| 5 | DS-11137 | 300 | 180 |

Each of Genfarm Clopyralid 600 and DS-11137 is a soluble concentrate with active ingredient Clopyralid at a formulation concentration of 600 g/L. In Genfarm Clopyralid, clopyralid is present as the dimethylamine salt.

Crop vigour and crop phytotoxicity were assessed at 7 days after application (DAA) and again at 14 DAA. Lucerne control was assessed at 7 DAA.

Crop vigour was assessed visually and recorded using a mean percentage scale relative to the untreated control, where 100%=untreated/no damage and 0%=crop death.

Crop phytotoxicity was assessed visually and recorded using a mean percentage scale relative to the untreated control, where 0%=untreated/no damage and 100%=crop death.

Weed control was assessed visually and recorded using a mean percentage scale relative to the untreated control, where 0%=untreated/no control and 100%=complete control/weed death.

The results are set out in Tables 19 to 21:

TABLE 19

Results - Crop Vigour of Canola cv 45Y93CL

| No. | Product | Rate Active ingredient (g ai/ha) | Crop Vigour (mean % relative to untreated control) 7 DAA | 14 DAA |
|---|---|---|---|---|
| 1 | Untreated control | Nil | 100 | 100 |
| 2 | Genfarm Clopyralid 600 | 90 | 100 | 99 |
| 3 | Genfarm Clopyralid 600 | 180 | 100 | 100 |
| 4 | DS-11137 | 90 | 99.5 | 99.5 |
| 5 | DS-11137 | 180 | 100 | 98.8 |

There was no significant difference between the results for crop vigour.

TABLE 20

Results - Crop Phytotoxicity of Canola cv 45Y93CL

| No. | Product | Rate Active ingredient (g ai/ha) | Crop Phytotoxicity (mean %) 7 DAA | 14 DAA |
|---|---|---|---|---|
| 1 | Untreated control | Nil | 0 | 0 |
| 2 | Genfarm Clopyralid 600 | 90 | 0 | 0 |
| 3 | Genfarm Clopyralid 600 | 180 | 0 | 0 |
| 4 | DS-11137 | 90 | 0 | 0 |
| 5 | DS-11137 | 180 | 0 | 0 |

There was no significant difference between the results for crop phytotoxicity.

TABLE 21

Results - Lucerne Control

| No. | Product | Rate Active ingredient (g ai/ha) | Lucerne Control (mean % relative to untreated control) 7 DAA | |
|---|---|---|---|---|
| 1 | Untreated control | Nil | 0 | b |
| 2 | Genfarm Clopyralid 600 | 90 | 27.5 | a |
| 3 | Genfarm Clopyralid 600 | 180 | 27.5 | a |
| 4 | DS-11137 | 90 | 28.8 | a |
| 5 | DS-11137 | 180 | 28.8 | a |

Means followed by the same letter do not significantly differ.

As shown in Tables 19 to 21, none of treatments 2 to 5 recorded any significant reduction in crop vigour relative to the untreated control. No symptoms of crop phytotoxicity were evident at 7 or 14 DAA for any of the herbicide treatments. A very low population of lucerne was present across the trial at the time of treatment application. Symptoms of suppression were evident across all herbicide treatments at 7 DAA, consisting of plant wilting and reduced vigour. Although this was mild, both formulations of clopyralid were statistically equivalent, with no difference between application rates.

Field Test 5: Auburn, South Australia

At Auburn in South Australia, a field trial was conducted to evaluate crop safety of DS-11137 compared to the registered formulation "Genfarm Clopyralid 600", when applied to barley cv. Compass. The previous crop had been wheat.

The barley crop was sown in a moist clay loam soil with a knife point press wheel system at a rate of 90 kg/ha to a depth of 2.5 cm.

At 68 days after sowing, when the crop stage had reached BBCH scale 22, treatments 2 to 5 in Table 22 below were applied:

TABLE 22

Treatments

| No. | Product | Rate Product (mL or g/ha) | Rate Active ingredient (g ai/ha) |
|---|---|---|---|
| 1 | Untreated control | Nil | Nil |
| 2 | Genfarm Clopyralid 600 | 250 | 150 |
| 3 | Genfarm Clopyralid 600 | 500 | 300 |
| 4 | DS-11137 | 250 | 150 |
| 5 | DS-11137 | 500 | 300 |

Each of Genfarm Clopyralid 600 and DS-11137 is a soluble concentrate with active ingredient Clopyralid at a formulation concentration of 600 g/L. In Genfarm Clopyralid, clopyralid is present as the dimethylamine salt.

Crop vigour and crop phytotoxicity were assessed at 7 days after application (DAA) and again at 15 DAA.

Crop vigour was assessed visually and recorded using a mean percentage scale relative to the untreated control, where 100%=untreated/no damage and 0%=crop death.

Crop phytotoxicity (such as chlorosis, necrosis) was assessed visually and recorded using a mean percentage scale relative to the untreated control, where 0%=untreated/no damage and 100%=crop death.

The results are set out in Tables 23 and 24 below.

None of treatments 2 to 5 recorded any significant reduction in crop vigour relative to the untreated control. No symptoms of crop phytotoxicity were evident at 7 or 14 DAA for any of the herbicide treatments. Both formulations of clopyralid were statistically equivalent, with no difference between application rates.

TABLE 23

Results - Crop Vigour of Barley cv. Compass

| No. | Product | Rate Active ingredient (g ai/ha) | Crop Vigour (mean % relative to untreated control) 7 DAA | 14 DAA |
|---|---|---|---|---|
| 1 | Untreated control | Nil | 100 | 100 |
| 2 | Genfarm Clopyralid 600 | 150 | 100 | 100 |
| 3 | Genfarm Clopyralid 600 | 300 | 100 | 99.5 |
| 4 | DS-11137 | 150 | 100 | 99.5 |
| 5 | DS-11137 | 300 | 100 | 100 |

There was no significant difference between the results for crop vigour.

TABLE 24

Results - Crop Phytotoxicity of Barley cv. Compass

| No. | Product | Rate Active ingredient (g ai/ha) | Crop Phytotoxicity (mean %) 7 DAA | 14 DAA |
|---|---|---|---|---|
| 1 | Untreated control | Nil | 0 | 0 |
| 2 | Genfarm Clopyralid 600 | 150 | 0 | 0 |
| 3 | Genfarm Clopyralid 600 | 300 | 0 | 0 |
| 4 | DS-11137 | 150 | 0 | 0 |
| 5 | DS-11137 | 300 | 0 | 0 |

There was no significant difference between the results for crop phytotoxicity.

Field Test 6: York, Western Australia

At York in Western Australia, a field trial was conducted to evaluate DS-11137 for pre-emergence control of volunteer pulses and other broadleaf weeds in wheat (*Triticum*), while assessing crop safety and yield effects. The efficacy of DS-11137 was compared with that of standard registered herbicides.

The wheat crop (cv. Sceptre) was sown in an untilled seed bed, the soil being grey sand, using a knife point press wheel system at a rate of 70 kg/ha to a depth of 1-1.5 cm. The previous crop had been barley.

Pre-emergently, the following herbicides were applied: Countdown at 2.5 L/ha, Trilogy at 1.6 L/ha and Roundup Ultra Max at 2 L/ha. Countdown and Trilogy are supplied by Adam Australia Pty Limited; Roundup Ultra Max is supplied by Bayer CropScience Pty Limited.

Treatments in the trial, set out in Table 25, were applied pre-planting and incorporated by sowing:

TABLE 25

Treatments

| No. | Product | Rate Product (mL or g/ha) | Rate Active ingredient (g ai/ha) | Supplier |
|---|---|---|---|---|
| 1 | Untreated control | Nil | Nil | |
| 2 | Callisto 480 g/L Mesotrione SC | 100 ml/ha | 48 | Syngenta Australia Pty Limited |
| 3 | Gallery 750 g/kg Isoxaben WG | 140 g/ha | 105 | Dow Agroscience Australia Limited |
| 4 | DS-11137 600 g/L | 75 ml/ha | 45 | |

To assess crop safety, the number of wheat plants per square metre were counted at 31 days after sowing (DAS). The results are in Table 26 below. Crop phytotoxicity was assessed at 31 DAS and again at 55 DAS: see Table 27. Crop vigour assessments for the same period are shown in Table 28.

TABLE 26

Results - Crop Safety: Emergence counts (plants/m$^2$) at 31 DAS

| No. | Product | Application Rate | 31 DAS (plants/m$^2$) |
|---|---|---|---|
| 1 | Untreated control | Nil | 185 |
| 2 | Callisto 480 g/L Mesotrione SC | 100 ml/ha | 179 |

TABLE 26-continued

Results - Crop Safety: Emergence counts (plants/m²) at 31 DAS

| No. | Product | Application Rate | 31 DAS (plants/m²) |
|---|---|---|---|
| 3 | Gallery 750 g/kg Isoxaben WG | 140 g/ha | 188 |
| 4 | DS-11137 600 g/L | 75 ml/ha | 183 |

There were no significant differences in crop emergence in response to the treatments.

TABLE 27

Results - Crop Phytotoxicity (%) at 31 DAS and 55 DAS

| No. | Product | Application Rate | Crop Phytotoxicity 31 DAS | 55 DAS |
|---|---|---|---|---|
| 1 | Untreated control | Nil | 0 | 0 |
| 2 | Callisto 480 g/L Mesotrione SC | 100 ml/ha | 0 | 0 |
| 3 | Gallery 750 g/kg Isoxaben WG | 140 g/ha | 0 | 0 |
| 4 | DS-11137 600 g/L | 75 ml/ha | 0 | 0 |

There were no phytotoxic effects.

TABLE 28

Results - Crop Vigour (%) at 31 DAS and 55 DAS

| No. | Product | Application Rate | Crop Phytotoxicity 31 DAS | 55 DAS |
|---|---|---|---|---|
| 1 | Untreated control | Nil | 100 | 100 |
| 2 | Callisto 480 g/L Mesotrione SC | 100 ml/ha | 100 | 100 |
| 3 | Gallery 750 g/kg Isoxaben WG | 140 g/ha | 100 | 100 |
| 4 | DS-11137 600 g/L | 75 ml/ha | 100 | 100 |

There was no reduced vigour observed in response to any treatment.

The primary target species in the trial were volunteer pulses including chickpeas (*Cicer arietinum*), field peas (*Pisum sativum*) and lupins (Lupinis) in wheat. Tables 29, 30 and 31 show percent control of each of these, assessed at 55 DAS and 79 DAS.

TABLE 29

Chickpea Control (%) at 55 DAS and 79 DAS

| No. | Product | Application Rate | Chickpea Control 55 DAS | 79 DAS |
|---|---|---|---|---|
| 1 | Untreated control | Nil | 0 f | 0 g |
| 2 | Callisto 480 g/L Mesotrione SC | 100 ml/ha | 99 ab | 92 bcd |
| 3 | Gallery 750 g/kg Isoxaben WG | 140 g/ha | 65 e | 65 f |
| 4 | DS-11137 600 g/L | 75 ml/ha | 100 a | 100 a |

Means followed by the same letter are not significantly different.

Table 29 shows that DS-11137 demonstrated strong control over chickpeas and performed significantly better than Gallery.

TABLE 30

Field Pea Control (%) at 55 DAS and 79 DAS

| No. | Product | Application Rate | Chickpea Control 55 DAS | 79 DAS |
|---|---|---|---|---|
| 1 | Untreated control | Nil | 0 d | 0 f |
| 2 | Callisto 480 g/L Mesotrione SC | 100 ml/ha | 100 a | 100 a |
| 3 | Gallery 750 g/kg Isoxaben WG | 140 g/ha | 27 c | 19 e |
| 4 | DS-11137 600 g/L | 75 ml/ha | 97 a | 99 a |

Means followed by the same letter are not significantly different.

Table 30 shows that DS-11137 demonstrated significant control over field peas, once again performing significantly better than Gallery.

TABLE 31

Lupin Control (%) at 55 DAS and 79 DAS

| No. | Product | Application Rate | Chickpea Control 55 DAA | 79 DAA |
|---|---|---|---|---|
| 1 | Untreated control | Nil | 0 d | 0 h |
| 2 | Callisto 480 g/L Mesotrione SC | 100 ml/ha | 97 a | 33 def |
| 3 | Gallery 750 g/kg Isoxaben WG | 140 g/ha | 78 c | 23 efg |
| 4 | DS-11137 600 g/L | 75 ml/ha | 94 ab | 35 def |

Means followed by the same letter are not significantly different.

Table 31 shows that DS-11137 demonstrated comparable control over lupins, compared with *Callisto* and superior performance compared to Gallery. All treatments decreased in efficacy over lupins from 55 DAS to 79 DAS.

Field Test 7: Roseworthy, South Australia

A field trial was conducted to evaluate DS-11137 for pre-emergence control of volunteer pulses: lentil (*Lens culinaris*), field peas (*Pisum sativum arvense*) and chickpea (*Cicer arietinum*) in wheat cv. Sceptre.

These treatments were compared to registered herbicide Gallery and Adama Mesoflex (a suspension concentrate formulation of 480 g/L of Mesotrione, available from Adama Australia Pty Limited). The treatments, which are set out in Table 32, were applied pre-planting and incorporated by sowing (IBS).

TABLE 32

Treatments

| No. | Product | Rate Product (mL or g/ha) | Rate Active ingredient (g ai/ha) | Supplier |
|---|---|---|---|---|
| 1 | Untreated control | Nil | Nil | |
| 2 | ADAMA Mesoflex 480 g/L Mesotrione SC | 100 mL | 48 | Adama Australia Pty Limited |
| 3 | Gallery 750 g/kg Isoxaben WG | 140 g/ha | 105 | Dow Agroscience Australia Limited |
| 4 | DS-11137 600 g/L | 75 ml/ha | 45 | |

The wheat crop (cv. Sceptre) was sown in a moist clay loam soil with a knife point press wheel system at a rate of 100 kg/ha to a depth of 2 to 3 cm.

At 25 days after sowing, when the crop stage had reached BBCH scale 12, crop emergence was noted. At 26 days after sowing, crop vigour and phytotoxicity were assessed, as well as weed control. At 56 days after sowing, the crop stage had reached BBCH scale 22; crop vigour and phytotoxicity were assessed, as well as weed control.

Crop emergence was assessed by counting 6 times per plot the number of plants along 50 cm of row and recording the result as the number of plants/m row.

Crop vigour was assessed visually and recorded using a mean percentage scale relative to the untreated control, where 100%=untreated/no damage and 0%=crop death.

Crop phytotoxicity was assessed visually and recorded using a mean percentage scale relative to the untreated control, where 0%=untreated/no damage and 100%=crop death.

Weed control was assessed visually and recorded using a mean percentage scale relative to the untreated control, where 0%=untreated/no control and 100%=complete control/weed death, relative to the untreated control.

The results are set out in Tables 33 to 38:

TABLE 33

Results - Crop Safety: Emergence counts (plants/m²) at 25 DAS

| No. | Product | Application Rate (g ai/ha) | Emergence 25 DAS (mean no./row) |
|---|---|---|---|
| 1 | Untreated control | Nil | 51.1 |
| 2 | Adama Mesoflex | 48 | 50.0 |
| 3 | Gallery | 105 | 49.8 |
| 4 | DS-11137 | 45 | 49.8 |

There were no significant differences in crop emergence in response to the treatments.

TABLE 34

Results - Crop Vigour (%) at 26 DAS and 56 DAS

| No. | Product | Application Rate (g ai/ha) | Crop Phytotoxicity 26 DAS | Crop Phytotoxicity 56 DAS |
|---|---|---|---|---|
| 1 | Untreated control | Nil | 100 | 100 |
| 2 | Adama Mesoflex | 48 | 99.8 | 99.5 a |
| 3 | Gallery | 105 | 99.8 | 98.5 a |
| 4 | DS-11137 | 45 | 100 | 98.8 a |

Means followed by the same letter are not significantly different.

There was no reduced vigour observed in response to any treatment. Crop vigour for DS11137 at 45 g ai/ha was equivalent to the untreated control, Mesoflex and registered herbicide Gallery.

TABLE 35

Results - Crop Phytotoxicity (%) at 26 DAS and 56 DAS

| No. | Product | Application Rate (g ai/ha) | Crop Phytotoxicity 26 DAS | Crop Phytotoxicity 56 DAS |
|---|---|---|---|---|
| 1 | Untreated control | Nil | 0.0 | 0.0 f |
| 2 | Adama Mesoflex | 48 | 0.0 | 0.0 f |
| 3 | Gallery | 105 | 0.0 | 0.3 ef |
| 4 | DS-11137 | 45 | 0.0 | 0.8 ef |

Means followed by the same letter are not significantly different.

There were no symptoms of crop phytotoxicity at 26 DAS. DS11137, Gallery and Mesoflex were not associated with any significant crop phytotoxicity compared to the untreated control at 56DAS.

TABLE 36

Volunteer Lentil (Lens culinaris) control (%) at 26 DAS and 56 DAS

| No. | Product | Application Rate (g ai/ha) | Lentil control (means % relative to untreated control) 26 DAS | Lentil control (means % relative to untreated control) 56 DAS |
|---|---|---|---|---|
| 1 | Untreated control | Nil | 0.0 d | 0.0 g |
| 2 | Adama Mesoflex | 48 | 87.3 a | 86.3 d |
| 3 | Gallery | 105 | 57.5 b | 71.3 e |
| 4 | DS-11137 | 45 | 98.3 a | 99.3 a |

Means followed by the same letter are not significantly different.

DS11137 recorded almost complete control of volunteer lentil at both 26 and 56 DAS and was significantly more effective than both Gallery and Mesoflex.

TABLE 37

Volunteer Field Peas (Pisum sativum
arvense) control (%) at 26 and 56 DAS

| No. | Product | Application Rate (g ai/ha) | Field Pea control (means % relative to untreated control) | |
|---|---|---|---|---|
| | | | 26 DAS | 56 DAS |
| 1 | Untreated control | Nil | 0.0 f | 0.0 f |
| 2 | Adama Mesoflex | 48 | 95.8 abc | 80.0 c |
| 3 | Gallery | 105 | 58.8 d | 45.0 d |
| 4 | DS-11137 | 45 | 96.5 abc | 94.0 a |

Means followed by the same letter are not significantly different.

For field peas, DS11137 provided a high level of control that was statistically equivalent to the other best performing treatments and significantly higher than Gallery and Mesoflex at 56 DAS.

TABLE 38

Volunteer Chickpea (Cicer arietum) control (%) at 56 DAS

| No. | Product | Application Rate (g ai/ha) | Chickpea control (means % relative to untreated control) 56 DAS |
|---|---|---|---|
| 1 | Untreated control | Nil | 0.0 f |
| 2 | Adama Mesoflex | 48 | 52.5 de |
| 3 | Gallery | 105 | 32.5 e |
| 4 | DS-11137 | 45 | 99.8 a |

Means followed by the same letter are not significantly different.

D511137 recorded almost complete control of chickpea at 56 DAS and was significantly more effective than Mesoflex and Gallery.

The above results show that DS11137, applied IBS at 45 g ai/ha, did not record a significant reduction in crop vigour compared to the untreated control or any significant crop phytotoxic symptoms, but recorded a high level of control of volunteer lentil (99%), field pea (94%) and chickpea (100%).

It will be appreciated from the data in the above tables that the efficacy of the formulations of the invention is at least comparable to that of prior art formulations and in many cases superior to prior art formulations. The formulations of the invention, being more concentrated, are more efficient.

In addition, an increase in concentration from 300 g ae/L to 600 g ae/L of clopyralid represents a 50% reduction in the volume of material to be formulated, transported, stored and applied by the end user.

The invention claimed is:

1. A stable clopyralid formulation comprising clopyralid at a concentration of at least 600 g ae/L, clopyralid being present in the form of at least two amine salts, one of which is the monoisopropylamine salt, wherein the formulation does not include any other herbicide.

2. The formulation of claim 1, wherein clopyralid is present in the form of two amine salts, the second amine salt being the monoethanolamine salt.

3. The formulation of claim 1, wherein the formulation is in the form of a soluble liquid.

4. A method of controlling one or more weeds in a crop, the method comprising applying the formulation of claim 1 to the crop.

5. The method of claim 4, wherein the crop is selected from the group consisting of wheat, canola and barley.

6. The method of claim 5, wherein the one or more weeds is selected from the group consisting of faba beans (*Vicia faba*), blue lupins (*Lupinus angustifolius*), volunteer lucerne (*Medicago sativa*), chickpea (*Cicer arietinum*), field peas (*Pisum sativum*), lupins (Lupinis) and lentil (*Lens culinaris*).

7. A method of controlling one or more weeds in a fallow area or pasture crop, the method comprising applying the formulation of claim 1 to the fallow area or pasture crop.

8. The method of claim 7, wherein the one or more weeds is selected from the group consisting of spear thistle (*Cirsium vulgare*), slender thistle (*Carduus tenuiflorus*) and prickly sowthistle (*Sonchus asper*).

* * * * *